(12) United States Patent
Lopez et al.

(10) Patent No.: US 9,195,959 B1
(45) Date of Patent: Nov. 24, 2015

(54) FULFILLMENT OF ORDERS FROM MULTIPLE SOURCES

(75) Inventors: Gustavo Eduardo Lopez, Seattle, WA (US); Paul J. Walsh, Seattle, WA (US); Jason Aaron McMahon, Seattle, WA (US); Christian M. Ricci, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1881 days.

(21) Appl. No.: 12/233,934

(22) Filed: Sep. 19, 2008

(51) Int. Cl.
G06Q 10/00 (2012.01)
G06Q 30/00 (2012.01)
G06Q 10/08 (2012.01)
G06Q 30/06 (2012.01)

(52) U.S. Cl.
CPC .......... *G06Q 10/087* (2013.01); *G06Q 30/0601* (2013.01)

(58) Field of Classification Search
CPC .......................... G06Q 10/087; G06Q 30/0601
See application file for complete search history.

(56) References Cited

U.S. PATENT DOCUMENTS

| | | | |
|---|---|---|---|
| 7,107,228 B1 * | 9/2006 | Walker et al. | 705/26 |
| 2002/0042756 A1 * | 4/2002 | Kumar et al. | 705/26 |

* cited by examiner

*Primary Examiner* — F. Zeender
*Assistant Examiner* — H Rojas
(74) *Attorney, Agent, or Firm* — Thomas | Horstemeyer, LLP

(57) ABSTRACT

This disclosure relates to order fulfillment by various fulfillment sources in a fulfillment network. A fulfillment source is selected in the fulfillment network to fulfill an order before a contingency deadline. If the order is not fulfilled by the deadline, other fulfillment sources are used. Lead times for fulfillment of orders for products are adjusted for respective fulfillment sources based on their past fulfillment history.

20 Claims, 5 Drawing Sheets

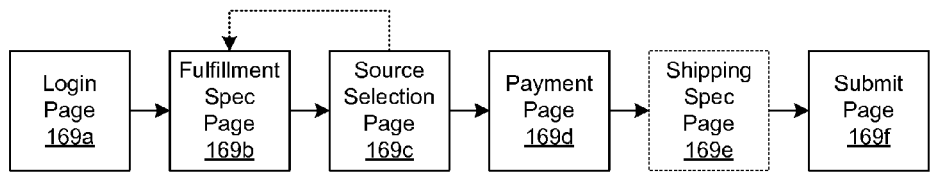

FIG. 2

Fulfillment Specification Page

Check the items for which fulfillment is to be specified

- ☐ Designer XYZ Shoes
- ☒ Designer XYZ Blouse
- ☒ Designer XYZ Skirt
- ☐ Designer XYZ Belt ○ Ship to the following address:   [Add New Address]

● 123 Baker Street
    Atlanta, Georgia  12345

○ 456 Peachtree Street
    Suite 1500
    Atlanta, Georgia  12345

● Customer Pickup

○ I would like to pick up my purchase within [ 5 ] miles of:

[ 90210 ]
  (enter address, intersection, Postal code, city, province, state, country code, etc.)

Fulfillment Source Selection

The product you have requested is available at the following locations. Please select on of the locations and click on Submit:

ABC Stores, 3535 Merchant Street, Atlanta, GA 12345
  ○ Designer XYZ Blouse    Available for pickup within 3-5 days
  ⦿ Designer XYZ Skirt     Available for pickup within 3-5 days Merchant XYZ, 1234 Market Street, Atlanta, GA 12345
  ⦿ Designer XYZ Blouse    Available for pickup within 5-7 days SellerX, 5678 K Street, Atlanta, GA 12345
  ○ Designer XYZ Blouse    Available for pickup within 5-8 days
  ○ Designer XYZ Skirt     Available for pickup within 4-6 days

[ Specify Central Point of Delivery ]         [ Continue ]

FIG. 4

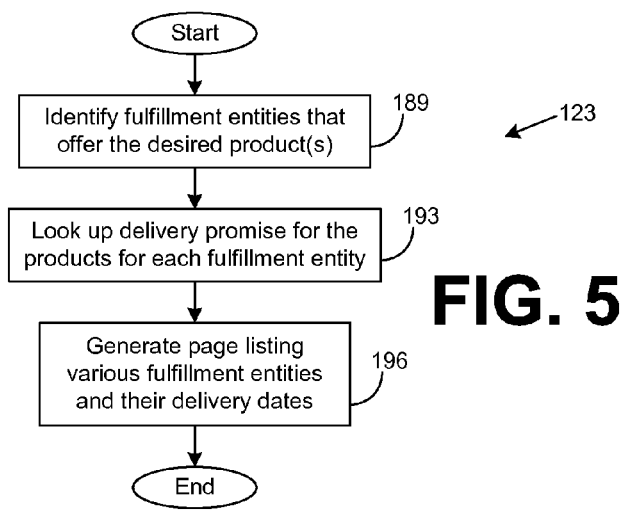

FIG. 5

FULFILLMENT OF ORDERS FROM MULTIPLE SOURCES

BACKGROUND

Often an individual who wishes to purchase a specific item is faced with the problem of finding the item in a store. Such an individual may go from store to store in search of the item. In the end, it can happen that such searches end in failure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a flow diagram that depicts an order pipeline implemented in a server in the multi-channel fulfillment environment of FIG. 1 according to an embodiment of the present disclosure.

FIG. 3 is a drawing of a user interface that facilitates specification of a fulfillment channel in the multi-channel environment of FIG. 1 for the fulfillment of an order according to an embodiment of the present disclosure.

FIG. 4 is a drawing of a user interface that facilitates specification of a fulfillment entity or source in the multi-channel environment of FIG. 1 for the fulfillment of an order according to an embodiment of the present disclosure.

FIG. 5 is a flowchart that provides one example of functionality implemented as a portion of an electronic commerce application implemented in a server in the multi-channel environment of FIG. 1 according to an embodiment of the present disclosure.

DETAILED DESCRIPTION

According to various embodiments, the inventory of products included within the fulfillment networks of multiple merchants or fulfillment entities are made available to purchase through a single network portal. Specifically, inventory may be stored in reliable and/or unreliable locations or fulfillment sources within a fulfillment network. According to the various embodiments, such inventory is made available for purchase by individuals through an electronic commerce system that facilitates sales of goods online regardless of whether the inventory is stored in an unreliable location as will be described. In addition, an online merchant can access the inventory of multiple other merchants to consummate the sale of products online as will be described.

In addition, as contemplated herein, the products that are subject to orders as described herein may comprise physical goods or services. In the case that a product is a service, the inventory may involve the scheduling and availability of the services, etc.

Figure 1:
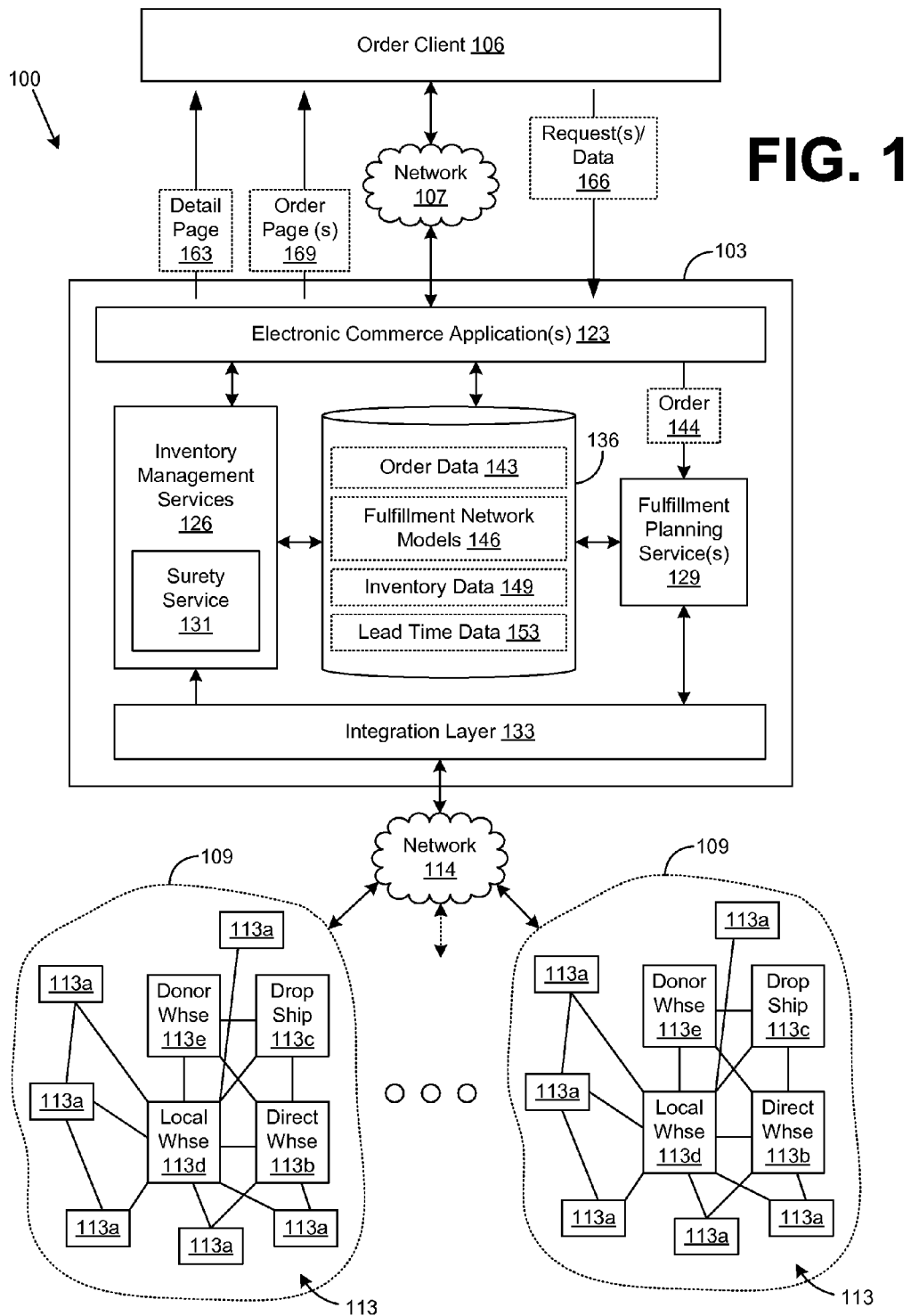
FIG. 1 is a drawing of a multi-channel fulfillment environment according to an embodiment of the present disclosure.

With reference to FIG. 1, shown is a multi-channel fulfillment environment 100 according to various embodiments of the present disclosure. The multi-channel fulfillment environment 100 includes one or more servers 103 that are in data communication with an order client 106. The one or more servers 103 are in data communication with the order client 106 via an appropriate network 107. The network 107 may comprise, for example, the Internet, intranets, wide area networks (WANs), local area networks, wireless networks, or other suitable networks, etc., or any combination of two or more such networks.

The one or more servers 103 may be arranged in a server bank or other appropriate configuration to handle requests from various clients such as the order client 106. To this end, each server 103 may comprise, for example, a server computer or other device with like capability. Also, the order client 106 may comprise, for example, a desktop computer, laptop computer, personal digital assistant, or other device with like capability. A personal digital assistant may comprise, for example, a mobile computing platform that may also operate as a cellular telephone or other system. In one embodiment, an order client 106 such a personal digital assistant may be "location aware" in that it includes Global Positioning System (GPS) or other location determination capability such that it can determine its geographical location at any given time. For example, an order client 106 may determine its physical location by virtue of triangulation with respect to cell towers, etc. Alternatively, the order client 106 may include cookies or other data structures that provide information about the location of the order client 106. Still further, the location of the order client 106 may be inferred from past history, etc.

The order client 106 may be employed to generate orders in any one channel of the multi-channel fulfillment environment 100. For example, the order client 106 may be, for example, a computer system such as a desktop computer, laptop computer, personal digital assistant, cellular telephone, or other order client 106 that is used by a customer to purchase products over the Internet or other network. Alternatively, the order client 106 may be used by a telephone operator that takes orders over the telephone and acts as a proxy for the customer. The order client 106 may be included as a kiosk or station within the brick and mortar store of a merchant to supplement the physical products offered in the store. Alternatively, the order client 106 may comprise equipment that operates at a point of sale such as a cash register, etc.

The multi-channel fulfillment environment 100 includes fulfillment networks 109, where each fulfillment network 109 is associated with a given entity such as a company or other organization. Each fulfillment network 109 includes one or more fulfillment sources 113 as will be described. The multi-channel fulfillment environment 100 implements multi-channel fulfillment. In this sense, multi-channel fulfillment may involve direct delivery to a destination address or delivery to a location such as a store where a customer can pick up the one or more products. In some cases, fulfillment in the multi-channel fulfillment environment 100 may simply involve taking one or more products off of the shelves of a store or otherwise out of the inventory associated with a store to be picked up by a customer at a later time. Such inventory may include products stored in a storeroom associated with a store, etc. Alternatively, such fulfillment may involve direct shipping from a point in a fulfillment network 109 of a given entity to a destination address specified by a customer as will be described. Further, fulfillment may involve shipments that occur within a fulfillment network 109 of a given entity so that the one or more products arrive at a predefined location for pickup by the customer or at a location from which the one or more products can be direct shipped to a destination address.

As was mentioned above, each of the fulfillment networks 109 comprises various fulfillment sources 113. Each of the fulfillment sources 113 comprises a site within the fulfillment network 109 in which an inventory of products may be stored and that implements the distribution of products to various endpoints. The fulfillment sources 113 may comprise, for example, materials handling facilities such as fulfillment centers, warehouses, stores, and other sites. In one example, the fulfillment sources 113 comprise brick and mortar stores 113a, direct warehouses 113b, drop-shipper sources 113c, local warehouses 113d, and donor warehouses 113e.

Associated with each fulfillment network 109, for example, are one or more fulfillment clients or servers (not shown) that are in data communication with the server 103 through a network 114. For example, a given fulfillment network 109 may include a centralized fulfillment client or server that communicates with the server 103 on behalf of the entire fulfillment network 109. Alternatively, each of the fulfillment sources 113 may include a fulfillment client or server that communicates directly with the server 103. Alternatively, there may be other arrangements of information technology associated with a given fulfillment network 109 that facilitate communication with the server 103 beyond those mentioned above. The network 114 may comprise, for example, the Internet, intranets, wide area networks (WANs), local area networks, wireless networks, or other suitable networks, etc., or any combination of two or more such networks. To this end, the networks 107 and 114 may comprise the same network (i.e. the Internet) or different networks, etc. The networks 107, 114 may facilitate data communication according to various standards or protocols such as Electronic Data Interchange (EDI) or other standards or protocols.

The brick and mortar stores 113a may comprise stores that sell merchandise to customers at various locations. A direct warehouse 113b is one that includes facilities to ship individual products or groups of products of a given order to a destination address as specified by a customer. A drop-shipper source 113c is a source such as a manufacturer that can direct ship to a predefined destination address based on information received from a retailer, thereby bypassing distributors. A local warehouse 113d is typically a warehouse that supplies merchandise to a group of brick and mortar stores 113a. Such local warehouses 113d may not include the ability to ship to other destinations beyond the stores 113a serviced.

The donor warehouse 113e is employed, for example, for storage of merchandise that is provided to other warehouses or other sites in one of the fulfillment networks 109. Such shipments are typically bulk shipments to other warehouses, stores, or sites within a given fulfillment network 109. To this end, a donor warehouse 113e may not have the packing capabilities to ship individual items or smaller quantities of items to given destination addresses of purchasers. In addition, each of the fulfillment networks 109 may include other types of fulfillment sources 113 such as fulfillment centers and other materials handling facilities as can be appreciated.

According to one embodiment, each fulfillment network 109 is operated by one of a number of fulfillment entities. A fulfillment entity may comprise, for example, a merchant that sells products to consumers through various brick and mortar stores 113a and via an online presence. For example, respective fulfillment entities may sell products in the brick and mortar stores 113a of their fulfillment network 109. To this end, other fulfillment sources 113 beyond the stores 113a in the fulfillment network 109 may be employed for distribution of products ultimately to the brick and mortar stores 113a. The merchant may comprise a "brick and mortar" merchant in the sense that they sell products only through the brick and mortar stores 113a. To this end, a fulfillment network 109 may be designed to service or supply the stores 113a. Such a fulfillment network 109 may not be designed to effectively and efficiently service the sale of products via an online presence over the Internet or other network.

For example, products stored in a local warehouse 113d that is only capable of supplying to one or more stores 113a are unavailable to be shipped directly to customers who purchase such products via an online presence of a merchant. Also, the inventory existing on the shelves, racks, of stores 113a, or otherwise existing in the inventory associated with stores 113a, is generally unreliable due to loss of inventory due to misplacement of products and theft. Thus, in these and other ways, the makeup or nature of a fulfillment network 109 may present inherent barriers that negatively impact the availability of some of the products for purchase via an online presence of the merchant. According to various embodiments, various approaches are employed to maximize the available inventory existing in a fulfillment network 109 of a fulfillment entity for purchase via an online presence of the entity as will be described.

There are several applications that are executed in the one or more servers 103 in order to provide for online sales of products and to implement order fulfillment by way of the fulfillment network 109. To this end, the various applications that are stored in a memory accessible by the servers 103 and executable by the servers 103 include an electronic commerce application 123, an inventory management service 126, a fulfillment planning service 129, and an integration layer 133. In addition, associated with the one or more servers 103 is a data store 136 that may be employed to store various data accessed by the applications executed on the servers 103 as will be described. Various applications may also be executed on the order client 106 such as, for example, browser applications that facilitate interaction between the order client 106 and the electronic commerce application 123 executed on the one or more servers 103 as will be described.

The electronic commerce application 123 is executed, for example, in order to facilitate the online purchase of products over the network 107. To this end, the electronic commerce application 123 performs various back end functions associated with the online presence of a merchant in order to facilitate the online purchase of products. For example, the electronic commerce application 123 may generate network pages such as web pages or other types of network content that are provided to a client 106. The network pages may be static in nature, or they may be generated dynamically. Such network pages may be generated dynamically using various software platforms such as AJAX, PERL, Java, Javascript, or other software platforms as can be appreciated. According to various embodiments, the network pages may include dynamic content or applications that facilitate an interactive experience for users of the client 106.

In performing the various functions involved in electronic commerce, the electronic commerce application 123 may access information stored in the data store 136. To this end, the data store 136 is representative of one or more data stores that facilitate the storage of data associated with the operation of the electronic commerce application 123 and other applications. The data store 136 may comprise, for example, a database or other data storage structure as can be appreciated.

The electronic commerce application 123 provides network content to the order client 106 in response to requests received from the order client 106. Such responses may be generated in response to requests that are received in the server 103, for example, as a user of the order client 106 navigates through the various pages of a network site associated with the online presence of a merchant. The electronic commerce application 123 may be configured to dynamically generate such network pages using information such as templates and other data in a data store 136 or information obtained from other locations as can be appreciated.

Stored within the data store 136 are various data that are employed or manipulated by the various applications executed on the servers 103. The data store 136 may exist within memory components such as data storage devices or other memory devices local to or part of the servers 103, or existing at other locations that are otherwise accessible to the servers 103 as can be appreciated.

Among the data stored in the data store 136 is order data 143 that comprises information about orders 144 for products generated based upon the interaction between the electronic commerce application 123 and the order client 106 over the network 107. Also stored in the data store 136 are a plurality of fulfillment network models 146. Each fulfillment network model 146 comprises a digital representation of a respective one of the fulfillment networks 109. To this end, each fulfillment network model 146 includes data about the existence of each of the fulfillment sources 113 within the corresponding fulfillment network 109, including any information relating to the shipping capabilities or other capabilities of such fulfillment sources 113. In addition, each fulfillment network model 146 may contain other information such as transportation links between respective fulfillment sources 113, transportation schedules, product storage capacity, storage locations within fulfillment sources 113, and other information.

The inventory data 149 stored in the data store 136 indicates the inventory stored in the various fulfillment sources 113 of respective fulfillment networks 109. Thus, the inventory data 149 may comprise, for example, quantities of products stored within respective bins or other storage locations within the fulfillment sources 113 of respective fulfillment networks 109. The lead time data 153 stored in the data store 136 indicates the lead times that it takes for the fulfillment sources 113 to fulfill orders for various products. The lead times stored as the lead time data 153 may be product specific or may relate to a category of products. Each of the lead times may also relate to a specific one of the fulfillment sources 113. For example, the lead time data may include a lead time for each product with respect to each fulfillment source 113 of a given fulfillment network 109. In other words, a lead time for a given product may vary among fulfillment sources 113.

Thus, the lead time data 153 may comprise lead times for each separate product within a given fulfillment source 113 that are separate from the lead times associated with other fulfillment sources 113 for the same products. This reflects the fact that the effectiveness in performing various fulfillment tasks may differ among different fulfillment sources 113 of a fulfillment network 109. For example, one fulfillment source 113 may respond poorly in fulfilling an order 144 for a product, whereas another fulfillment source 113 may act in a judicious manner in supplying the same product. According to various embodiments, a calculation is made to adjust the lead times provided by the fulfillment entities that operate a respective one of the fulfillment networks 109 based upon actual historical performance of a given one of the fulfillment sources 113 as will be described.

The inventory management service 126 is executed in the one or more servers 103 in order to maintain the accuracy of the inventory data 149 and to perform other functions. One example function of the inventory management service 126 is to communicate with the various fulfillment sources 113 of the fulfillment networks 109, or a central computer system of one or more fulfillment networks 109 in order to receive current inventory data 149 and lead time data 153 that are stored in the data store 136.

The fulfillment planning service 129 is executed in the server 103 to implement fulfillment of orders 144 generated by the electronic commerce application 123. To this end, the fulfillment planning service 129 communicates with the various fulfillment sources 113 of respective fulfillment networks 109 or other information technology associated with the fulfillment networks 109. The fulfillment planning service 129 may comprise a plurality of services as can be appreciated.

The integration layer 133 operates to facilitate communication between the various applications on the server 103 and the computer systems or other systems of the fulfillment networks 109. To this end, the integration layer 133 facilitates communication between many different types of inventory control systems and/or other systems associated with respective fulfillment networks 109 and the applications on the server 103.

The electronic commerce application 123 facilitates a generation of an order 144 for one or more products in the server 103 based upon interaction with the order client 106 over an appropriate network 107 as described above. To this end, a customer may manipulate a browser application or other appropriate application on the order client 106 in order to interact with the electronic commerce application 123. The electronic commerce application 123 may include a network server such as a web server or other type of server in order to provide browser access to the order client 106.

The order client 106 is used, for example, by a customer to implement the online purchase of products. Alternatively, the order client 106 may comprise a computer system or other system operated by a telephone operator that communicates with customers taking orders 144 for products over the telephone. Further, the order client 106 may be located within a store 113a in one of the fulfillment networks 109 to supplement the products offered by the store 113a with those that can be offered by the online presence of various merchants who operate the fulfillment networks 109.

During the course of generating an order 144 for the purchase of a product, the order client 106 may request various detail pages 163 from the electronic commerce application 123. A detail page 163 lists one or more products as well as their prices and other product information. Also, detail pages 163 may list estimated delivery times for the products listed. Since detail pages 163 are generated quite often given that customers frequently wish to view many different products during the course of consummating a purchase for a given product, then it is necessary to generate the detail pages 163 very quickly. For example, in some situations it may be deemed necessary to generate a detail page in approximately 50 milliseconds or so.

As such, it may not be practical to ultimately generate a reliable delivery time for one or more products listed in the detail page 163, given that lead times may vary from one fulfillment source 113 to the next, and from one fulfillment network 109 to the next. Consequently, it may be the case that a worst case or best case delivery time is specified for a given product in the data store 136 that can be obtained quickly and transmitted to the order client 106 in response to requests for detail pages 163.

Assuming that a customer has selected a product from a detail page 163 to be purchased, then the electronic commerce application 123 generates various order pages 169 in response to requests 166 from the order client 106 that facilitate the gathering of information from the order client 106 necessary to consummate the sale of one or more products. The order pages 169 may thus include forms to be filled in by customers that provide payment information, address information, fulfillment preferences, product configuration information, and other information as will be described.

The lead times for a product or product category that are adjusted based on performance of a fulfillment source 113 within a respective fulfillment network 109 may be employed in generating a more accurate promised delivery date sent as one of the order pages 169 to the order client 106 during the order process. This more accurate promised delivery date can be sent due to the fact that order pages 169 are generated less frequently than detail pages 163 and need not be generated as quickly. Once an order 144 for one or more products is generated, then the fulfillment planning service 129 implements the fulfillment of the order 144 by communicating with respective fulfillment sources 113 of one or more of the fulfillment networks 109 as will be described.

The electronic commerce application 123 may be controlled or operated by an order generation entity that obtains inventory and lead time data 149, 153 from fulfillment entities for their fulfillment networks 109. The fulfillment entities may comprise brick and mortar merchants that run one or more stores 113a or other outlets. Thus, the order generation entity that operates the electronic commerce application 123 can leverage the inventory of multiple merchants that may or may not have an online presence. Consequently, the inventory available to sell by the order generation entity is bounded only by the inventory included in the fulfillment networks 109 to which the order generation entity has access. To this end, agreements may be set up between the order generation entity and the respective merchants that operate the fulfillment networks 109 for the payment of a commission or other revenue sharing agreement for sales of products in a fulfillment network 109 that occur by virtue of the electronic commerce application 123.

A fulfillment entity may operate a fulfillment network 109 of material handling facilities such as fulfillment centers, warehouses 113b/113d/113e, stores 113a, and/or other fulfillment structures in order to implement the fulfillment of orders 144 generated by the electronic commerce application 123. Alternatively, a fulfillment entity may interact with third parties in order to implement fulfillment of orders 144 generated by the electronic commerce application 123. Such third parties may operate a fulfillment network 109 to fulfill orders 144 based on requests from the fulfillment entity that controls the electronic commerce application 123.

A fulfillment network 109 may accomplish distribution of products to stores 113a via a network of materials handling facilities such as the warehouses 113b, 113d, or 113e, or the drop-shipper source 113c as described above. A fulfillment network 109 may be designed for the supply of products to the various stores 113a, but may not be optimized for the delivery of products via direct shipment to homes for purchases made online via the Internet or other network. In particular, for example, customers may purchase products via an online presence of the merchant that operates a fulfillment network 109 and request that such products be delivered to a given one of the stores 113a for pickup. Alternatively, a customer may specify that products associated with an order 144 be delivered to a specified destination address. As a consequence, it may be the case that only a limited number of fulfillment sources 113 within a given fulfillment network 109 are capable of meeting the demands of a given customer.

For example, a direct warehouse 113b may be able to ship products to any destination address as specified by a customer. By contrast, a local warehouse 113d may only be able to ship products to stores 113a within a fulfillment network 109. In addition, stores 113a themselves include an inventory of products for which the merchant would like to maximize the probability of their being sold to customers.

On some occasions, a customer may purchase a product by manipulating the order client 106 as described above and specifying that a product is to be delivered to a given store 113a. In response, such a product may be taken off the shelves or otherwise separated from the inventory of the store 113a and placed aside for the customer to pick up at the appropriate time. However, this practice clashes with the desire of a given merchant to maximize the availability of products available for sale on the shelves, racks, or other inventory associated with the store 113a for those customers who wish to shop in the store 113a. Stated another way, for each product taken off the shelf in a store 113a, one less product is available for customers browsing through the store 113a to purchase. Thus, there is an incentive for stores 113a not to maintain or put aside inventory to fulfill orders 144 received through the electronic commerce application 123 so as to be able to maximize product offerings to walk-in customers.

In addition, store inventory is notoriously unreliable due to the fact that stores 113a experience a certain amount of theft of products, or products are easily misplaced within the stores 113a such that they are effectively lost for purposes of purchase online.

By virtue of the interaction between the electronic commerce application 123 and an order client 106 described above, the electronic commerce application 123 may generate an order 144 for the purchase of one or more products.

In doing so, a customer may view a number of detail pages 163 in order to identify one or more products for purchase. The desired products may be placed in a virtual shopping cart as can be appreciated. Once the customer has completed selection of products by placing such products in a virtual shopping cart, then the customer may enter an "order pipeline" in which several order pages 169 are transmitted to the order client 106 according to a predefined sequence in order to obtain the needed information from the order client 106 in order to consummate the purchase of the one or more products subject to the order 144.

To this end, various order pages 169 may facilitate a selection of a fulfillment channel that is to be used for the fulfillment of the order 144. For example, a customer may indicate that they wish for a product to be direct shipped to a given destination address. In such case, a customer may manipulate one or more order pages 169 to select or enter a destination address for the shipment of one or more products subject to the order 144. Alternatively, a customer may select a fulfillment channel in which a product is delivered to a brick and mortar store 113a to be picked up by the customer. Such may be a preferable approach, where a customer may choose not to ultimately purchase the product once they see it in the store 113a.

In specifying a fulfillment channel in which a product is delivered to a store 113a for customer pick up, a customer may specify a geographical area within which such a store 113a should be located. In subsequent order pages 169, the electronic commerce application 123 may facilitate a selection of a respective one of a plurality of stores 113a within the geographical area at which the one or more products subject to the order 144 may be picked up. In some cases, two or more fulfillment networks 109 may include a store 113a within a given geographical area specified by a customer. The geographical area may be specified by virtue of a predefined distance surrounding an address, intersection, zip code, city and state, or other geographical point. In addition, the geographical area may be specified in some other manner. In this respect, the order pipeline that comprises the order pages 169 may facilitate the selection of a merchant that operates a given one of the fulfillment networks 109 for fulfillment of the order 144 by delivery to a given store 113a for customer pick up.

The lead times stored in the lead time data 153 allow the electronic commerce application 123 to provide an estimate as to when a product will be fulfilled according to a given fulfillment channel. In some cases, delivery can be immediate, for example, where a store near the client 106 selected for fulfillment has the product in stock for customer pickup. Also, in some cases, a fulfillment source 113 such as a store 113a may have an unlimited inventory such as might be the case, for example, where the store 113a comprises a restaurant that serves a predefined menu of products, etc.

Once an order 144 is generated with a fulfillment channel specified, the order 144 is then provided to the fulfillment planning service 129 executed within the one or more servers 103. The fulfillment planning service 129 implements the fulfillment of the order 144 by communicating with respective fulfillment clients associated with one or more fulfillment sources 113 of a given one of the fulfillment networks 109. Alternatively, the fulfillment planning service 129 may communicate with a centralized server or other system associated with the given fulfillment network 109 that facilitates communication with respective ones of the fulfillment sources 113.

The fulfillment planning service 129 generates instructions that are transmitted to one or more fulfillment sources 113 within one of the fulfillment networks 109 to implement the fulfillment of a given order 144. In doing so, the fulfillment planning service 129 may communicate with the fulfillment sources 113 to confirm that a given one of the fulfillment sources 113 will implement the fulfillment of the order 144 before the due date that was provided to the customer during the order process as described above.

In one embodiment, the fulfillment entity that is used to fulfill the order is selected by the customer during navigation through the order pages 169 of the order pipeline. For example, where a customer desires to have one or more products delivered to a store 113a, then the customer may wish to select the exact store 113a where they wish to pickup the one or more products. Alternatively, it is also possible that the actual fulfillment entity is selected automatically. In particular, during the order pipeline, a customer may be informed of the location of a store 113a where they should pickup products. Alternatively, if the customer indicates that a product is to be delivered to a given destination address, the fulfillment planning service 129 may automatically select one of the fulfillment entities that should fulfill the order.

Where selection of a fulfillment entity is automatic, various approaches may be employed to determine which fulfillment entity is selected to fulfill a given order 144. For example, various fulfillment entities may be given priority based upon the size of a commission or other fees paid to the operator of the electronic commerce application 123.

Once the fulfillment entity that is to fulfill an order 144 is selected, according to one embodiment, the fulfillment planning service 129 initially transmits a demand notification to the fulfillment entity. The demand notification may be sent, for example, to a client, server, or other system of a respective one of the fulfillment sources 113 of the fulfillment network 109 of the fulfillment entity. The demand notification requests that the fulfillment source 113 confirm that it can fulfill the order 144 for one or more products before a contingency deadline. The fulfillment planning service 129 specifies the contingency deadline so as to provide a sufficient period of time between the contingency deadline and the ultimate delivery due date associated with the order 144 in order to fulfill the order 144 by way of a second one of the fulfillment sources 113 of the fulfillment entity, or by working with a second fulfillment entity. This is done in situations where a first identified fulfillment source 113 fails to notify the fulfillment planning service 129 that it has taken steps to fulfill the order 144 before the contingency deadline. The delivery due date is a promised delivery date that was provided to the customer when the order 144 was created as described above.

For example, assume that a respective one of the fulfillment sources 113 is a store 113a. In such case, the store 113a may wish to keep inventory accessible to the public who purchases products in the store 113a in a traditional manner as long as possible. Accordingly, the store 113a may wait until just before the contingency deadline to act upon a given order 144. Such action may comprise, for example, taking a product off of the shelves or separating a product from other inventory associated with the store 113a and placing it in a special location to await pickup by a customer. Once the contingency deadline has passed without hearing from the store 113a that appropriate action was taken to fulfill the order 144, then the fulfillment planning service 129 may take steps to fulfill the order 144 via some other fulfillment source 113 of the same fulfillment entity or a second fulfillment entity.

However, if upon receiving a demand notification, a respective fulfillment source 113 such as a store 113a knows that it cannot fulfill the order 144 for some reason, the store 113a may transmit a message to the fulfillment planning service 129 that it cannot fulfill such order 144. If the fulfillment source 113 can fulfill the order 144, then the fulfillment source 113 responds by sending a confirmation to the fulfillment planning service 129 that confirms that the fulfillment source 113 can fulfill the order 144 for the products before the contingency deadline.

Alternatively, the demand notification may specify that fulfillment is to be performed in the very near future such that there will not be sufficient time to implement a contingency fulfillment plan if timely fulfillment does not occur. In such case, the first identified fulfillment source 113 is given a predefined period of time within which to respond before turning to another fulfillment source 113. If a customer has specified that fulfillment is to be performed by a given fulfillment source 113 such as a store 113a, a failure of the store 113a to timely respond to a demand notification, or a negative response received from the store 113a indicating that it cannot fulfill the request, may result in a cancellation or implementation of a suggested change in the order 144 so that it can be fulfilled (i.e. ordering a different product that is available at the store 113a rather than a product that is not in stock, etc.).

Assuming that the fulfillment source 113 has confirmed that it can fulfill the order 144, the fulfillment planning service 129 sends a fulfillment order instructing the fulfillment source 113 to fulfill the order 144 before the contingency deadline or at a predefined deadline or time. Where a contingency deadline is specified, the contingency deadline is specified before the promised delivery date associated with the order 144 that was provided to the order client 106 by the electronic commerce application 123. Such promised delivery date may be a best estimated delivery date based upon information stored in the data store 136 as can be appreciated. As mentioned above, the contingency deadline is specified so as to allow a period of time between the contingency deadline and the promised delivery date so that if the fulfillment source 113 suddenly is unable to properly fulfill the order 144, the fulfillment planning service 129 can take such action to find a contingency source to fulfill the order 144 before the promised delivery date.

To ensure that the fulfillment source 113 has taken appropriate action to fulfill the order 144 before the contingency deadline or other delivery time, the fulfillment planning service 129 waits to receive a confirmation of fulfillment from the fulfillment source 113 of a respective fulfillment network 109 before the contingency deadline. Such confirmation of fulfillment may be termed an "Advance Ship Notification." In the case that a store 113a is the designated fulfillment source 113, then the appropriate action taken to fulfill the order 144 might comprise taking a product from the shelves of the store 113a, or otherwise separating the product from the inventory associated with the store 113a and placing it aside to be picked up by the customer. Where a direct warehouse 113b or drop-shipper source 113c is designated as the fulfillment source 113 for an order, the appropriate action may be to pick a product to be packaged for shipping, etc.

If the Advance Ship Notification is not received before the contingency deadline, then the fulfillment planning service 129 assumes that the fulfillment source 113 will not ultimately achieve fulfillment of the order 144. As such, the fulfillment planning service 129 sends a fulfillment cancellation to the respective fulfillment source 113 that cancels the fulfillment order previously sent.

Thereafter, the fulfillment planning service 129 arranges for the fulfillment of the order 144 by a second one of the fulfillment sources 113 in the fulfillment network 109 of the fulfillment entity, or by a second fulfillment entity, by the promised delivery date if possible. In this manner, the fulfillment planning service 129 protects the interests of the customers in ensuring that products are timely fulfilled as per promised delivery dates provided by the electronic commerce application 123 in generating the order 144. Also, due to the fact that the order generation entity has access to the inventory of multiple different fulfillment entities, the order generation entity has a degree of flexibility in ensuring orders 144 are fulfilled in a timely manner.

In addition, the surety service 131 executed as part of the inventory management service 126 operates to adjust the lead time data 153 to provide a more accurate estimate of a promised delivery date to be provided to an order client 106 during the process of generating the order 144. In particular, the lead time data 153 is communicated to the servers 103 by the fulfillment entities that operate the respective fulfillment networks 109. For example, lead time data 153 may be provided by individual fulfillment sources 113 using computer systems or servers that communicate with the servers 103 through an appropriate network 114. Alternatively, a given fulfillment entity may operate a centralized computing system that provides the lead time data 153 to the servers 103. The lead time data 153 may be provided, for example, on a periodic basis.

The lead time data 153 may be employed by the electronic commerce application 123 in order to provide at least a moderately accurate estimate of the ultimate delivery date for ordered products to the order client 106 through the order pipeline. For example, during the order process, a customer may specify that they wish to receive the one or more products associated with the order 144 at a store 113a for pickup. Alternatively, based upon the delivery options requested by the customer, the fulfillment planning service 129 may determine that a drop-shipper source 113c should be employed, or that a direct warehouse 113b should supply the one or more products to the customer.

According to one embodiment, in generating a promised delivery date for the products of the order 144, the lead time data 153 associated with one or more respective fulfillment sources 113 such as a store 113a may be examined in order to provide such information to the order client 106. Also, the fulfillment planning service 129 may examine the lead time data 153 to identify an optimal one of the fulfillment entities, or an optimal one of the fulfillment sources 113 of a selected fulfillment entity to be used to implement fulfillment of the order 144.

According to various embodiments, the surety service 131 tracks the fulfillment performance of each of the fulfillment sources 113 of the respective fulfillment networks 109 with respect to individual products or categories of products and adjusts the lead time data 153 received from the fulfillment entities for such fulfillment sources 113 based upon a fulfillment history corresponding to the respective fulfillment sources 113. As a consequence, the fulfillment planning service 129 may take into account the past performance of fulfillment entities, and more particularly, fulfillment sources 113 when in selecting fulfillment entities and/or the fulfillment sources 113 to fulfill orders 144. Also, such adjusted lead time data 153 may be employed by the electronic commerce application 123 in generating a realistic promised delivery date to the order client 106 during the generation of an order 144 as will be described.

In addition, the fulfillment planning service 129 may be configured to periodically generate reports regarding the fulfillment reliability of the fulfillment sources 113 of the respective fulfillment entities that are sent to respective fulfillment entities. Such reports may be used as an instrument by the fulfillment entities in order to improve the performance of poorly performing fulfillment sources 113.

Referring next to FIG. 2, shown is a flow diagram that depicts various order pages 169 generated by the electronic commerce application 123 during an order process according to various aspects of the present disclosure. The flow diagram thus depicts an order pipeline 171 that is used to consummate an order 144 (FIG. 1) for one or more products by way of interaction between the order client 106 (FIG. 1) and the electronic commerce application 123 (FIG. 1). The flow diagram of FIG. 2 assumes that products were previously selected for purchase, for example, by placing such products in a virtual shopping cart and indicating that one wishes to check out and purchase the products selected as can be appreciated.

To begin, a login page 169a is generated by the electronic commerce application 123 and served up to the order client 106 in order to log the order client 106 into the system. In this respect, the electronic commerce application 123 may store information about a respective customer that was provided by a customer when they signed up to purchase products through the electronic commerce application 123 in the past. The login page 169a may require a customer to enter a user name and password, or other information as can be appreciated.

Once logged in, the electronic commerce application 123 generates a fulfillment specification page 169b that allows a customer to select a fulfillment channel to be used for the fulfillment of the order 144. A customer may select direct shipment to an address, or the customer may specify that a product be delivered to a store for customer pick up as will be described. Also, other fulfillment channels may be specified such as drop-shipper source 113c or other channels.

Once a fulfillment channel is specified, then the electronic commerce application 123 serves up the source selection page 169c in which the customer may select from among two or more fulfillment options for the fulfillment of the order 144 if applicable. In this respect, the electronic commerce application 123 may have identified two or more fulfillment entities that may be capable of fulfilling the order 144 currently being generated. For example, the source selection page 169c may list the fulfillment entities without regard for specific fulfillment sources 113 where a customer desires to have a product directly shipped to a given address. As such, the specific locations of the fulfillment sources 113 may not matter since products are directly shipped.

Alternatively, the fulfillment sources 113 listed in the source selection page 169c may comprise stores 113a (FIG. 1). Such stores 113a may be listed with respect to their address so that a customer can select which one of the stores 113a at which they would like to pick up the ordered products. In one embodiment, where the order client 106 is location aware due to on-board GPS or like system, the order client 106 may provide its location to the electronic commerce application 123 that may then identify one or more stores 113a or other fulfillment sources 113 that are physically closest to the order client 106 where the customer can go to pickup the ordered products.

Once the order client 106 has indicated the selection of a given fulfillment source 113 by manipulating the source selection page 169c, then the electronic commerce application 123 serves up a payment page 169d. This may provide for the selection of various payment instruments such as credit cards, accounts, or other payment methods as can be appreciated. The payment for the products that are the subject of the order 144 may be accomplished via any one of a number of approaches. For example, one approach involves taking payment via the electronic commerce application 123 directly and passing the payment on to the one or more fulfillment entities that implement fulfillment for the order 144. In this approach, a commission or finders fee may be extracted from the purchase price for directing the customer to the respective fulfillment entities.

Alternatively, payment may be taken by the fulfillment entity at a given fulfillment source 113 such as a store 113a, etc. In such case, a commission or finders fee may be forwarded by the fulfillment entities to the entity that operates the electronic commerce application 123. Also, other commercial arrangements may be established between the fulfillment entities and the entity that operates the electronic commerce application 123. For example, the fulfillment entities may pay fees for the service provided by the electronic commerce application 123 in terms of a click-through fee, etc.

The electronic commerce application 123 then serves up a shipping specification page 169e in the case that a customer has selected that products be shipped to a given destination address.

The shipping specification page 169e would not be necessary to be generated in the case that a customer has indicated that such products are to be picked up at a given store 113a or other fulfillment source 113 since the fulfillment network 109 of the respective fulfillment entity will cause such products to be delivered to the respective store 113a or other fulfillment source 113 for pick up. Finally, the submit page 169f may be generated that provides an overview of all of the parameters associated with the order 144 such as fulfillment information, payment information, product information, and any other relevant information. The submit page 169f may also include a button or other component that may be manipulated by a customer to cause the purchase to be consummated by the electronic commerce application 123.

Referring next to FIG. 3, shown is one example of a fulfillment specification page 169b according to one embodiment of the present disclosure. The fulfillment specification page 169b includes a virtual shopping cart 172 that lists each of the one or more products 173 associated with a respective order. A toggle selector 174 is situated next to each of the products 173 that are the subject of the order in the virtual shopping cart 172. The fulfillment specification page 169b facilitates specification of a fulfillment channel for each of the products 173 included in the virtual shopping cart 172.

The fulfillment specification page 169b also lists a number of fulfillment channels 176 by which fulfillment of an order 144 (FIG. 1) for one or more products selected in the virtual shopping cart 172 may be accomplished. For example, one of the fulfillment channels 176 involves shipping directly to a destination address 178 specified by a customer. As shown, a customer may select a given destination address 178 by clicking on a toggle selector associated with a given destination address 178. Alternatively, an "add new address" button 179 is provided to facilitate the generation of subsequent order pages 169 that facilitates the entry of a new destination address 178 as can be appreciated. In addition, an address book or other listing of addresses may be maintained for prearranged points of delivery of products. For example, one may choose to have products delivered to an agent that works with one or more fulfillment entities, but does not actually store inventory of products. For example, such agents may comprise packaging shops, coffee shops, or other agents that can receive shipments that are held temporarily before pickup.

Another one of the fulfillment channels 176 involves delivery to a store or other site such as, for example, an agent described above for customer pick up. Such site may be determined based upon the actual location of the order client 106. In one embodiment, the physical location of the purchaser may be determined where the order client 106 is location aware as described above. For example, the order client 106 may automatically provide its location to the electronic commerce application(s) 123 during the creation of the order 144 for goods. Alternatively, the fulfillment channel 176 further includes an area limiter 181 and a reference field 183 that may be selected via the associated toggle selector to determine a location for the search of an appropriate pickup site. By virtue of the area limiter 181 and the reference field 183, a customer may specify a given geographical area of a physical presence such as a store 113a (FIG. 1) where a customer wishes for a product subject to an order 144 to be delivered.

Regardless of whether the location of the order client 106 is determined automatically from its location awareness or based upon the information entered in the area limiter 181 and the reference field 183, the electronic commerce application 123 ultimately performs a search through the fulfillment network models 146 of respective fulfillment entities to identify whether such fulfillment entities include a physical presence such as a store 113a or other fulfillment source 113 within the geographical area specified by the reference field 183 and the area limiter 181. The inventory associated with such fulfillment entities is thus available for the fulfillment of products selected in the virtual shopping cart 172 for the order 144 to be picked up by the customer within the area specified.

When the location of the order client 106 is determined manually, the geographical area is specified by virtue of the fact that the customer may enter information in the reference field 183 and may specify an area in terms of distance around such point of reference that ultimately defines the geographical area within which the customer would like to pick up the one or more products associated with an order 144. The fulfillment specification page 169b thus allows a customer to select a specific fulfillment channel 176 and provides such detailed information such as a destination address 178 or a geographical area specified by the reference field 183 and the area limiter 181 so that fulfillment by a selected one of the fulfillment channels 176 can be implemented. Upon receiving the information associated with a selected one of the fulfillment channels 176 by manipulation of the fulfillment specification page 169b, the electronic commerce application 123 proceeds to identify those fulfillment entities that are capable of fulfilling the order 144 for goods currently selected in the virtual shopping cart 172.

Assuming that the fulfillment channel 176 selected by a customer is direct shipment to a destination address 178, then the electronic commerce application 123 searches through the inventories associated with each fulfillment entity as represented in the inventory data 149 to identify those inventories that include the one or more products selected in the virtual shopping cart 172 that are included in the order 144. In addition, a lead time associated with each product subject to the order is identified for the respective inventories of the respective fulfillment entities by examining the lead time data 153 associated with the product for each of the inventories. Thereafter, the electronic commerce application 123 generates the source selection page 169c that includes a listing of each of the fulfillment entities associated with the inventories that include the product. The products are listed along with a lead time for each product next to each fulfillment entity included in the source selection page 169c. Thereafter, the source selection page 169c is sent to the order client 106 to facilitate a selection of one or more of the fulfillment entities for fulfillment of the products of the order 144 selected in the virtual shopping cart 172.

Alternatively, if a customer selects a fulfillment channel 176 involving a pick up of the one or more products of the order 144 at a store 113a or other site associated with a given fulfillment entity, then the electronic commerce application 123 proceeds to examine the fulfillment network models 146 associated with the respective fulfillment entities to identify those fulfillment networks 109 that include a store 113a or other site within the geographical area determined automatically or specified in the fulfillment specification page 169b by the customer as described above. Once the fulfillment entities that have a physical presence within the geographical area specified are identified, then the inventories associated with such fulfillment entities as represented by the inventory data 149 are examined to identify whether the one or more products selected in the virtual shopping cart 172 are included therein.

Also, lead times associated with the products for each of the inventories are identified in the lead time data 153. In particular, lead times may be identified for the fulfillment sources 113 such as stores 113a that fall within the geographical area specified by the customer and where the customer may wish to pick up the products subject to the order 144. Thereafter, the electronic commerce application 123 generates the source selection page 169c that includes a listing of each of the fulfillment entities in terms of the store 113a or other site at which respective products will be available for pick up. Also, associated with each fulfillment source 113 in such a listing are the lead times that indicate when a product will be available at the store 113a or other site for pickup by a customer.

With reference to FIG. 4, shown is an example of a source selection page 169c in which a listing of a number of stores 113a or other sites in terms of the store 113a name and address is included along with the products 173 available at such stores 113a and the lead times for each product 173 at each store 113a or other site. The lead times indicate the times within which the products 173 subject to the order 144 will be available at the respective sites. The source selection page 169c includes toggle selectors 184 that facilitate the specification of the products 173 at one or more of the stores 113a or other fulfillment sources 113 at which a customer wishes to pick up a purchased product 173. A customer may manipulate the toggle selectors 184 or other selection components to indicate the fulfillment source 113 at which they wish to pick up the respective products 173. Alternatively, the source selection page 169c may list the entities that have a fulfillment network 109 that can be used to fulfill the order 144 without regard to specific locations of fulfillment sources 113a in cases where one or more products 173 are to be delivered to a specific destination address 178. Alternatively, the system may automatically choose the fulfillment network 109 of a given fulfillment entity to use for the fulfillment of the order 144 automatically without input by the customer. In such case, it would not be necessary to generate the source selection page 169c which can be eliminated from the order pipeline 175.

Assuming, however, that a customer has made their selection in the source selection page 169c, then the customer may click on the continue button 186 to proceed to the next page in the order pipeline 175. Where additional products 173 exist in the virtual shopping cart 172 for which a fulfillment channel 176 has yet to be selected, the electronic commerce application 123 shall revert back to the fulfillment specification page 169b in order to further specify fulfillment channels 176 for such products 173. Alternatively, the user may click on the "specify central delivery" button 187 in order to identify a location where they wish for all products indicated in the source selection page 169c to be delivered. To this end, the central point of delivery may be one of the stores 113a or other site such as a site associated with an agent as described above that provides temporary storage of the products 173 for pickup. For example, the point of pickup may comprise a concierge service in a mall, etc. In order to identify the central point of delivery, one or more additional pages may be presented that facilitate searching and/or selection of the central point of delivery. Such additional pages may present the existing stores 113a that may be used as a central point of deliver as well as additional locations. To this end, provision will need to be made to cause delivery of products 173 to the selected central point of delivery when multiple stores 113a or other sites are specified for fulfillment as can be appreciated. Thus, an advantage is provided in that one may specify products 173 are to be purchased from multiple different stores 113a or other sites and can pickup the products 173 at single location.

Turning then to FIG. 5, shown is a flowchart that provides one example of functionality implemented as a portion of the electronic commerce application 123 according to various embodiments. Alternatively, the flowchart of FIG. 5 depicts steps of a method implemented in the server(s) 103 according to various embodiments. The functionality of the flowchart of FIG. 5 depicts one example of how the electronic commerce application 123 generates the source selection page 169c (FIG. 2) as described above.

Beginning with box 189, the electronic commerce application 123 identifies the fulfillment entities that include a given product or products in their inventory stored in their respective fulfillment networks 109 based upon the fulfillment channel 176 (FIG. 3) specified by the customer. To do so, the electronic commerce application 123 examines the inventory data 149 and fulfillment network models 146 in light of the fulfillment channel 176 specified.

For example, if a customer specifies that the product is to be delivered to a predefined destination address 178 (FIG. 3), then the electronic commerce application 123 determines which fulfillment networks 109 for corresponding entities have the product in inventory and ultimately would be able to ship the product from a respective fulfillment source 113 to the specified destination address 178. Alternatively, if a customer specifies that they wish to pick up a product at a location within a given geographical area, then the electronic commerce application 123 determines which fulfillment networks 109 of respective entities have a presence in the specified geographical area and, of these fulfillment networks 109, which also include the product in inventory such that it can be delivered to the respective pickup site.

Next in box 193, a delivery lead time is looked up in the lead time data 153 (FIG. 1) for the one or more products for each possible fulfillment option. The lead time may be expressed as a single time period or a range of time periods. Then in box 196, the electronic commerce application 123 generates the source selection page 168c (FIG. 4) that lists options for fulfillment of the one or more products that are subject to the order 144 (FIG. 1). Note that where multiple products are subject to a given order 144, it is possible that multiple source selection pages 169c may be generated to select the entity or fulfillment source 113 that is to be used for the fulfillment of a given order 144 as mentioned above. Thereafter, the source selection page 169c is sent to the order client 106 (FIG. 1).

Figure 6:
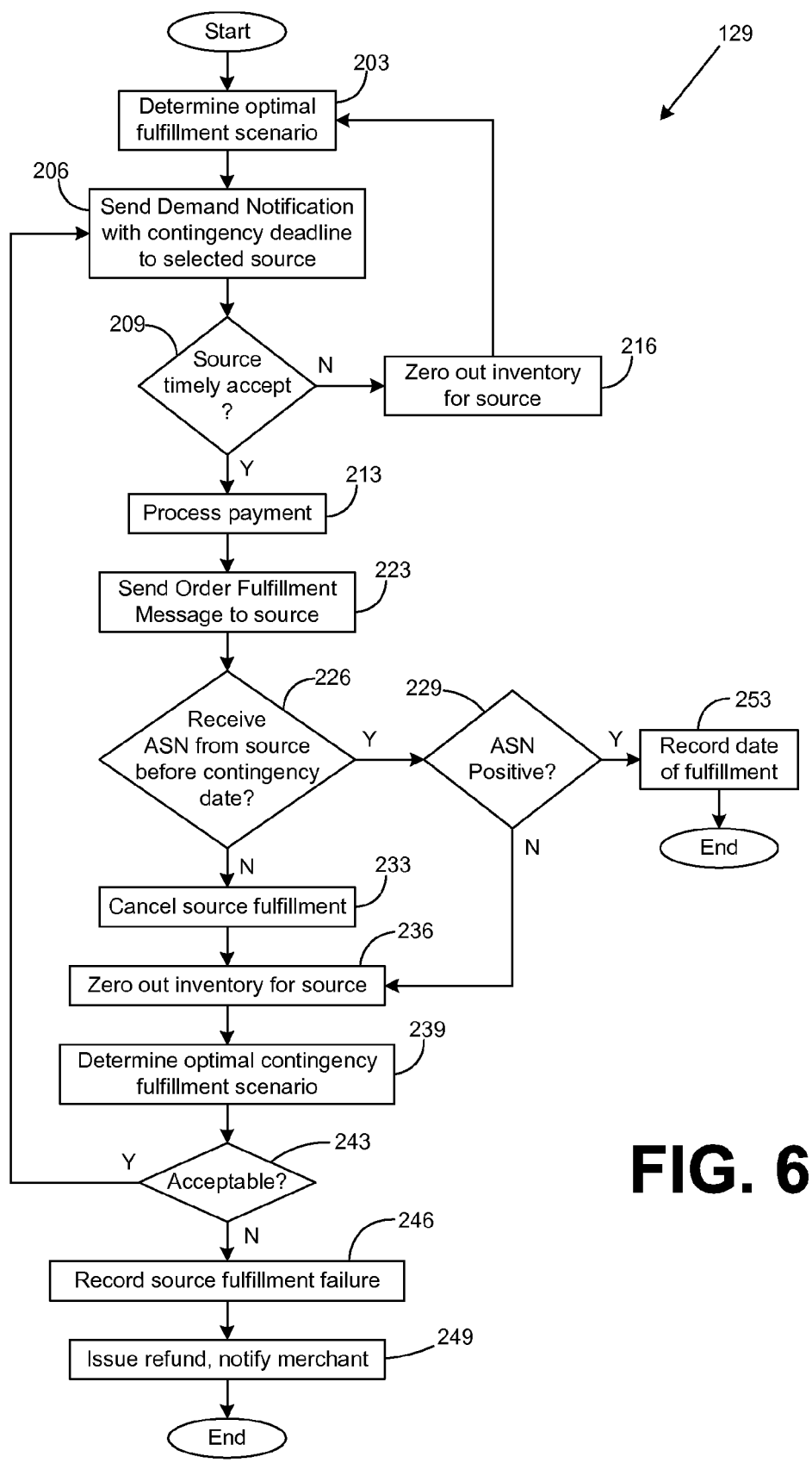
FIG. 6 is a flowchart that provides one example of functionality implemented as a portion of a fulfillment planning service implemented in a server in the multi-channel environment of FIG. 1 according to an embodiment of the present disclosure.

With reference then to FIG. 6, shown is a flowchart that provides one example of the operation of the fulfillment planning service 129 in implementing the fulfillment of an order 144 (FIG. 1) as described above according to one embodiment of the present disclosure. Alternatively, the flowchart of FIG. 6 may be viewed as depicting steps of a method implemented in the one or more servers 103 (FIG. 1) as described above.

To begin, in box 203, the fulfillment planning service 129 determines an optimal fulfillment scenario for the fulfillment of an order 144 (FIG. 1). The fulfillment scenario may be directed at one product or a group of products that is/are the subject of the order 144. A fulfillment scenario may involve action taken by one or more fulfillment sources 113 (FIG. 1) within the fulfillment network 109 (FIG. 1) in order to cause the one or more products subject to an order 144 to be provided to a customer. To this end, once the order 144 is generated, it may indicate which fulfillment network 109 is to be used for the fulfillment of the order 144 such as might be the case where a customer has specified that they wish to pick up a product at a specific store 113a, etc.

Alternatively, if the entity/fulfillment source 113 of the product is selected automatically without input from a customer, then the fulfillment planning service 129 may select a fulfillment network 109 of a respective entity for fulfillment of the order 144 based upon predefined criteria or rules, etc. As an additional alternative, fulfillment scenarios may be generated for each one of the fulfillment networks 109 associated with respective ones of the fulfillment entities.

Within a given fulfillment network 109, it is possible to have multiple possible fulfillment scenarios. For example, it is possible within a single fulfillment network 109 that a donor warehouse 113e may ship a product to a local warehouse 113d which in turn may ship the product to a store 113a. Alternatively, fulfillment may entail taking the product off a shelf or rack in a given store 113a and placing it aside for pickup by the customer. Such are examples of many different fulfillment scenarios that may be implemented to fulfill a given order 144.

In order to determine the optimal fulfillment scenario, the fulfillment planning service 129 may generate a plurality of scenarios for fulfillment of an order 144 based upon both the fulfillment network model 146 (FIG. 1) and the inventory data 149 (FIG. 1) associated with a given fulfillment network 109 that indicates where various products are stored within the fulfillment network 109. A fulfillment scenario may be represented as a list of actions or tasks to be undertaken to fulfill an order 144. From there, the fulfillment planning service 129 may generate a cost associated with each one of the fulfillment scenarios. Also, consideration of each of the fulfillment scenarios includes consideration of whether the promised delivery date can be met and the geographical location of the customer, delivery address, or location at which a customer intends to pickup the one or more products. Based upon the costs associated with each respective fulfillment scenario, the ability of a fulfillment scenario to meet the promised delivery dates, the geographical location considerations, or other considerations, the fulfillment planning service 129 may select an optimal one of the fulfillment scenarios for the fulfillment of the order 144.

Once the optimal fulfillment scenario is identified in box 203, then in box 206, a demand notification is transmitted to the respective one of the fulfillment sources 113 with a contingency deadline associated therewith (if applicable) to determine whether the respective fulfillment source 113 is capable of fulfilling the order 144 by the contingency deadline or other time frame. In box 209, the fulfillment planning service 129 waits to receive a response from the respective fulfillment source 113. If the fulfillment source 113 timely transmits a confirmation that it can fulfill the order 144 by the contingency deadline or within some other specified time frame, then the fulfillment planning service 129 proceeds to box 213. On the other hand, if the fulfillment source 113 is not capable of fulfilling the order 144 by the contingency deadline, or if the fulfillment source 113 fails to timely reply to the demand notification, then the fulfillment planning service 129 moves to box 216.

In box 216, the inventory for the respective fulfillment source 113 that indicated it could not fulfill the order 144 or that did not timely respond to the demand notification in box 209 is zeroed out for the respective one or more products of the order 144 in the data store 136 (FIG. 1). This is because the respective fulfillment source 113 has indicated a lack of reliability for the fulfillment of orders 144. By zeroing out the inventory, such fulfillment source 113 will not be considered for fulfillment of future orders 144 for the same product or products. The fulfillment planning service 129 then reverts back to box 203 to identify the next optimal fulfillment scenario for the fulfillment of the order 144. This may be the next best fulfillment scenario relative to the fulfillment scenario previously selected.

Assuming that a given fulfillment source 113 timely accepts the responsibility of fulfilling the order 144 by timely responding to the demand notification transmitted to the fulfillment source 113 in box 206 above, then in box 213 the fulfillment planning service 129 processes a payment for the order 144. Next, in box 223, an order fulfillment message is transmitted to the respective fulfillment source 113 requesting that the respective fulfillment source 113 take action to fulfill the order 144 as is appropriate by the contingency deadline or in some other time frame.

Such action may entail, for example, taking one or more products off of a store shelf in a store 113a and placing them in a reserve location to be picked up by a customer at a later time. Alternatively, such action may involve directing a drop-shipper source 113c to deliver a product to a predefined destination address 178 (FIG. 3), or directing a direct warehouse 113b to direct ship a product to a given destination address 178. The order fulfillment message includes a contingency deadline by which the fulfillment source 113 must provide an Advance Ship Notification to the fulfillment planning service 129 that indicates whether action has been or will be taken as deemed necessary to fulfill the order 144.

In box 226, the fulfillment planning service 129 determines whether the advance ship notification has been received from the respective fulfillment source 113 before the contingency deadline. If so, then the fulfillment planning service 129 proceeds to box 229. Otherwise, the fulfillment planning service 129 progresses to box 233. In box 233, the fulfillment planning service 129 transmits a fulfillment cancellation order to the fulfillment source 113 as it is assumed that, since nothing was heard from the fulfillment source 113 indicating that fulfillment of the order 144 has been initiated, the fulfillment source 113 will not be able to fulfill the order 144. Consequently, in box 236, the inventory for the respective fulfillment source 113 is zeroed out for the respective one or more products of the order 144 in the data store 136 (FIG. 1). This is because the failure of the respective fulfillment source 113 to fulfill the order 144 indicates a lack of reliability for the fulfillment of future orders 144. By zeroing out the inventory, such fulfillment source 113 will not be considered for fulfillment of future orders 144 for the same product or products. According to one embodiment, the inventory may remain zeroed out until the inventory data is refreshed using new inventory data from the respective fulfillment entity.

Next, in box 239, the next optimal fulfillment scenario is determined to be employed as a contingency fulfillment scenario. This may be done in much the same way as the determination made in box 203 as described above. For instance, the same portion of the fulfillment planning services 129 may be employed to make the determinations in box 203 and 239. This may involve implementing fulfillment with a different fulfillment entity that operates a different fulfillment network 109, etc.

To make the determination in box 239, various criteria may be employed such as, for example, a requirement that the promised delivery deadlines must be met at all costs. Alternatively, greater priority may be given to selecting a contingency fulfillment scenario that minimizes cost, regardless of whether the promised delivery deadline is met. Further, other criteria may be employed to select a contingency fulfillment scenario. In box 243, it is determined whether the optimal fulfillment scenario determined in box 239 meets the criteria specified by the respective merchant. For instance, a merchant may specify that an order must be fulfilled by a given delivery deadline or not at all. Such delivery scenarios may relate to events that require delivery beforehand, where late delivery is worthless (i.e. the need to deliver a wedding cake before the wedding and not after).

Alternatively, the merchant may specify a maximum delivery cost they are willing to bear. In addition, there may be other criteria specified by the merchant for the fulfillment of orders 144. If the contingent fulfillment scenario determined in box 239 is not acceptable based on the given criteria, then the fulfillment planning service 129 proceeds to box 246. Otherwise, the fulfillment planning service 129 reverts back to box 206 to implement the contingency fulfillment plan. To this end, it is possible that the fulfillment planning service 129 may loop back more than once, where multiple contingency plans may be implemented due to multiple fulfillment failures with respect to a given order 144.

Assuming that the fulfillment planning service 129 has proceeded to box 246, the fulfillment planning service 129 records the fulfillment failure on the part of the original fulfillment source 113 so as to be able to track the reliability of the respective fulfillment source 113 for use in determining whether such fulfillment source is to be used for fulfillment of future orders 144. Then, in box 249, a refund is issued to the customer and the merchant is notified of the failure to fulfill the order 144 so that the merchant can take such steps as is deemed appropriate to address the situation with the customer.

Referring back to box 226, if an Advance Ship Notification is received, then in box 229, the fulfillment planning service 129 determines whether the Advance Ship Notification is a positive notification or a negative notification. A positive notification indicates that appropriate steps have been or will be taken to fulfill the order. A negative notification indicates that fulfillment has failed for some reason. If the Advance Ship Notification is positive, then the fulfillment planning service 129 proceeds to box 253 in which the information about the fulfillment of the order 144 is stored in the data store 136. Such information may include, for example, the one or more delivery dates associated with the order 144. This information is stored so as to be able to track the fulfillment track record of a given fulfillment source 113 in the future. If the Advance Ship Notification is negative, then the fulfillment planning service 129 proceeds to box 236 as described above.

By virtue of the functionality described above, the fulfillment planning service 129 can make inventory associated with unreliable fulfillment sources 113 such as stores 113a of multiple different fulfillment entities available for purchase through the electronic commerce application 123 (FIG. 1). Also, such an approach allows brick and mortar merchants to implement an online presence using their existing fulfillment network infrastructure.

Figure 7:
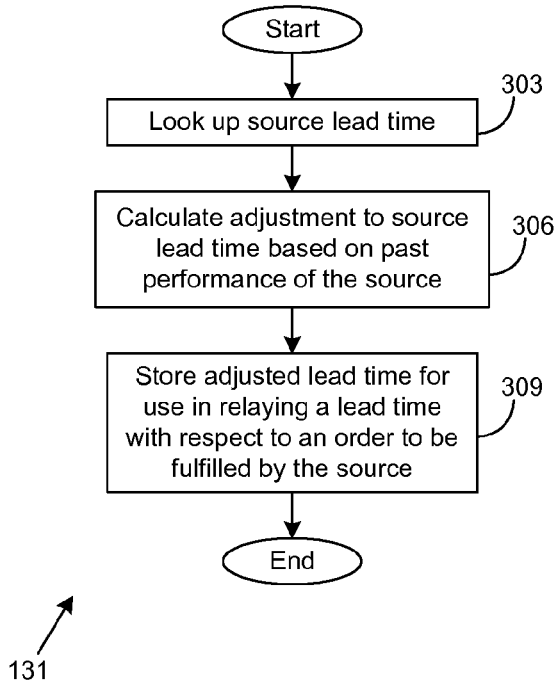
FIG. 7 is a flowchart that provides one example of a surety service implemented in a server in the multi-channel environment of FIG. 1 according to an embodiment of the present disclosure.

With reference to FIG. 7, shown is one example of a flowchart that depicts the operation of the surety service 131 (FIG. 1) according to various embodiments of the present disclosure. Alternatively, the flowchart of FIG. 7 may depict various steps of a method implemented in the server 103 (FIG. 1) in order to adjust lead times included in the lead time data 153 (FIG. 1) based upon past performance of respective fulfillment sources 113 as mentioned above.

To begin, in box 303, the surety service 131 looks up a lead time in the lead time data 153 (FIG. 1) for a respective fulfillment source 113 with respect to one or more products. Specifically, the lead time may relate to a single product or a category of products. Then, in box 306, the surety service 131 calculates an adjustment to the lead time stored in the lead time data 153 based upon the past performance of the respective fulfillment source 113 in fulfilling orders 144 with respect to the product or a category of products. Where a category of products is considered, the fulfillment history with respect to any product fitting within a given category will bear upon the lead time associated with the category.

In calculating the adjustment to the lead time for one or more products or a category of products, various approaches may be taken. For example, the adjustment may involve adding an amount of time such that the lead time equals the maximum time it took to fulfill any one order 144 (FIG. 1) for a product or products within a given category. Alternatively, actual past fulfillment times may be averaged in order to determine how to adjust the lead times so as to match the average fulfillment times. A fulfillment time in this sense may comprise the time it took for a given fulfillment source 113 to ship or otherwise make a product available to a customer for pickup. In another alternative, lead times may be adjusted based on a success rate of a given fulfillment source 113 in implementing the fulfillment of an order 144 by the lead time articulated by such fulfillment source 113 before adjustment. For example, the lead time may be adjusted higher as the success rate of a fulfillment source 113 is lower based on a predefined formula, etc.

In addition, there may be many other ways to adjust the lead times stored in the data store 136 for respective products or categories of products based upon a prior fulfillment history of a fulfillment source 113. In this respect, the lead time data 153 thus includes lead times for respective products or categories of products for every one of the fulfillment sources 113.

Next, in box 309, the adjusted lead time is stored in the data store 136 in association with the respective fulfillment source 113 and is used to relay lead times with respect to an order 144 to be fulfilled by the fulfillment source 113 during the interaction between the electronic commerce application 123 (FIG. 1) and the order client 106 (FIG. 1) in generating the order 144 as described above.

Figure 8:
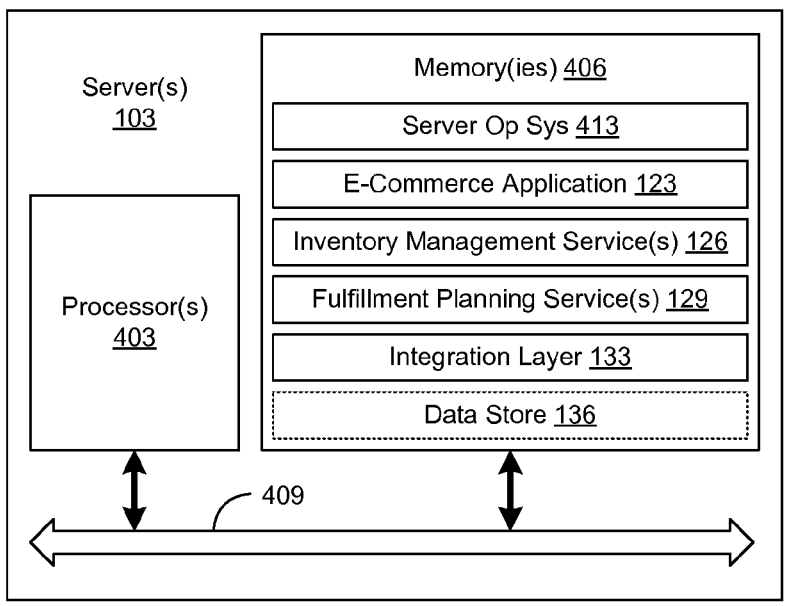
FIG. 8 is a schematic diagram that provides one example of the one or more servers employed in the multi-channel environment of FIG. 1 according to various embodiments of the present disclosure.

Referring next to FIG. 8, shown is a schematic block diagram of one example of a server 103 according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus as can be appreciated. Alternatively, the server 103 may represent multiple servers such as might exist in a server bank or other arrangement.

Stored in the memory 406 are several components that are executable by the processor 403 or that are stored within the memory 406. In particular, stored in the memory 406 are a server operating system 413, the electronic commerce application 123, the inventory management service 126, the fulfillment planning service 129, and the integration layer 133. Also, the data store 136 may be stored in the memory 406. It is understood that there may be other applications that are stored in the memory 406 and are executable by the processor 403 as can be appreciated. Also, other data may be stored in the memory 406 and accessed by the processor 403. According to one embodiment, the data store 136 may comprise, for example, a database or other appropriate data storage structure. Where any component discussed herein is implemented in the form of software, any one of a number of programming languages such as, for example, C, C++, Java, Perl, Python, Flash, Javascript, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components such as the electronic commerce application 123, the inventory management service 126, the fulfillment planning service 129, and any other functionality implemented as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5, 6, and 7 show the functionality and operation of portions of the electronic commerce application 123, the fulfillment planning service 129, and the inventory management service 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts or flow diagrams of FIGS. 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 5, 6, and 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the electronic commerce application 123, the inventory management service 126, the fulfillment planning service 129, and/or any other functionality implemented as described above comprise software or code, the same can be embodied in any computer-readable medium for use by or in connection with an instruction execution system such as, for example, a processor in a computer system or other system. In this sense, the applications or services may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising:
  storing a plurality of inventories in a memory accessible by a server, each of the plurality of inventories expressing an inventory of products associated with a corresponding one of a plurality of fulfillment entities;
  facilitating interaction in the server with a client to generate an order for one of the products to be fulfilled by a selected one of the plurality of fulfillment entities;
  receiving a directive from the client during the interaction that the one of the products is to be picked up from a physical site within a geographical area;
  identifying multiple ones of the plurality of inventories that include the one of the products and that correspond to respective ones of the plurality of fulfillment entities that have a fulfillment network with a physical presence within the geographical area specified by the client;
  identifying a lead time associated with the one of the products for each of the multiple ones of the plurality of inventories;
  generating a listing of each of the plurality of fulfillment entities associated with a respective one of the multiple ones of the plurality of inventories, the listing including the lead time for the one of the products for each of the plurality of fulfillment entities;
  serving the listing up to the client during the interaction between the server and the client;
  directing a selected one of the fulfillment entities to take steps to fulfill the order for the product; and
  specifying a contingency deadline by which the selected one of the plurality of fulfillment entities is to take action to fulfill the order, where a predefined period of time exists between the contingency deadline and a promised delivery date provided to the client.

2. A method, comprising:
  storing a plurality of inventories in a memory accessible by a server, each of the plurality of inventories expressing an inventory of products associated with a corresponding one of a plurality of fulfillment entities;
  identifying multiple ones of the plurality of inventories that include a product;
  identifying a lead time associated with the product for each of the multiple ones of the plurality of inventories;
  generating a listing of each of the plurality of fulfillment entities associated with a respective one of the multiple ones of the inventories, the listing including the lead time for the product for each of the plurality of fulfillment entities;
  serving the listing up to a client;
  directing a selected one of the plurality of fulfillment entities to take steps to fulfill an order for the product; and
  specifying a contingency deadline by which the selected one of the plurality of fulfillment entities is to take action to fulfill the order, where a predefined period of time exists between the contingency deadline and a promised delivery date provided to the client.

3. The method of claim 2, wherein identifying multiple ones of the plurality of inventories that include the product further comprises identifying a plurality of fulfillment networks associated with corresponding ones of the plurality of fulfillment entities that have a physical presence within a predefined geographical area received from the client.

4. The method of claim 3, further comprising:
  facilitating interaction in the server with the client to generate the order for the product to be fulfilled by the selected one of the plurality of fulfillment entities; and
  receiving a directive from the client that the product is to be picked up from a physical site within the predefined geographical area during the interaction.

5. The method of claim 2, further comprising:
  facilitating interaction in the server with the client to generate the order for the product to be fulfilled by the selected one of the plurality of fulfillment entities; and
  where the listing is served up to the client during the interaction to facilitate a selection of the selected one of the plurality of fulfillment entities.

6. The method of claim 2, further comprising:
  canceling the fulfillment of the order by the selected one of the plurality of fulfillment entities if confirmation is not received from the selected one of the plurality of fulfillment entities that the action to fulfill the order has been taken by the contingency deadline; and
  implementing fulfillment of the order using a contingent fulfillment source after the fulfillment of the order is canceled.

7. The method of claim 2, further comprising periodically updating the plurality of inventories with inventory data received periodically from the corresponding ones of the plurality of fulfillment entities.

8. A system, comprising:
  a server;
  a plurality of inventories stored in a memory accessible by the server, each of the plurality of inventories expressing an inventory of products associated with a corresponding one of a plurality of fulfillment entities; and
  electronic commerce logic executable in the server, the electronic commerce logic comprising:

logic that identifies multiple ones of the plurality of inventories that include a product;

logic that identifies a lead time associated with the product for each of the multiple ones of the plurality of inventories;

logic that generates a listing of each of the plurality of fulfillment entities associated with a respective one of the multiple ones of the plurality of inventories, the listing including the lead time for the product for each of the plurality of fulfillment entities;

logic that serves the listing up to a client;

logic that directs a selected one of the plurality of fulfillment entities to take steps to fulfill an order for the product; and logic that specifies a contingency deadline by which the selected one of the plurality of fulfillment entities is to take action to fulfill the order, where a predefined period of time exists between the contingency deadline and a promised delivery date provided to the client.

9. The system of claim 8, wherein the logic that identifies multiple ones of the plurality of inventories that include the product further comprises logic that identifies a plurality of fulfillment networks associated with corresponding ones of the plurality of fulfillment entities that have a physical presence within a predefined geographical area received from the client.

10. The system of claim 9, wherein the electronic commerce logic further comprises logic that facilitates interaction with the client to generate the order for the product to be fulfilled by the selected one of the fulfillment entities, where a directive is received from the client indicating that the product is to be picked up from a physical site within the predefined geographical area during the interaction.

11. The system of claim 8, wherein the electronic commerce logic further comprises logic that facilitates interaction in the server with the client to generate the order for the product to be fulfilled by the selected one of the plurality of fulfillment entities, where the listing is served up to the client during the interaction to facilitate a fulfillment entity selection.

12. A method, comprising:
  interacting with a server using a client to generate an order for a product, where a plurality of network pages are received in the client from the server during the interaction;
  selecting a fulfillment channel for a fulfillment of the order in one of the plurality of network pages on the client;
  selecting one of a plurality of fulfillment entities for the fulfillment of the order in one of the plurality of network pages on the client; and
  specifying a contingency deadline by which the one of the plurality of fulfillment entities is to take action to fulfill the order, where a predefined period of time exists between the contingency deadline and a promised delivery date provided to the client.

13. The method of claim 12, wherein selecting the fulfillment channel for the fulfillment of the order in the one of the plurality of network pages on the client further comprises specifying that the order is to be fulfilled by customer pickup at a physical site associated with the one of the plurality of fulfillment entities.

14. The method of claim 13, further comprising specifying a geographical area within which the physical site is to be located for the customer pickup.

15. The method of claim 12, wherein selecting the one of the plurality of fulfillment entities for the fulfillment of the order in one of the plurality of network pages on the client further comprises selecting a physical site at which a customer pickup associated with the order is to take place.

16. The method of claim 12, further comprising cancelling the fulfillment of the order by the one of the plurality of fulfillment entities if confirmation is not received from the one of the plurality of fulfillment entities that the action to fulfill the order has been taken by the contingency deadline.

17. The method of claim 16, further comprising implementing the fulfillment of the order using a contingent fulfillment source after the fulfillment of the order is canceled.

18. The method of claim 12, further comprising identifying a lead time associated with the product for each of a plurality of inventories.

19. The method of claim 18, further comprising periodically updating the plurality of inventories with inventory data received periodically from corresponding ones of the plurality of fulfillment entities.

20. The method of claim 12, wherein the one of the plurality of network pages includes a listing of the plurality of fulfillment entities.

* * * * *